(12) United States Patent
Chien et al.

(10) Patent No.: US 7,700,520 B2
(45) Date of Patent: Apr. 20, 2010

(54) METHODS OF MAKING PLATINUM AND PLATINUM ALLOY CATALYSTS WITH NANONETWORK STRUCTURES

(75) Inventors: Chun Ching Chien, Taoyuan (TW); King Tsai Jeng, Taoyuan (TW); Shean Du Chiou, Taoyuan (TW); Su Hsine Lin, Taoyuan (TW)

(73) Assignee: Institute of Nuclear Energy Research, Jiaan Village, Longtan, Taoyuan (TW)

( * ) Notice: Subject to any disclaimer, the term of this patent is extended or adjusted under 35 U.S.C. 154(b) by 1398 days.

(21) Appl. No.: 10/907,950

(22) Filed: Apr. 22, 2005

(65) Prior Publication Data

US 2009/0312180 A1 Dec. 17, 2009

(51) Int. Cl.
*B01J 37/34* (2006.01)
*B01J 31/00* (2006.01)
*B01J 21/00* (2006.01)

(52) U.S. Cl. .......................... 502/334; 502/5; 502/170; 502/173; 502/240; 502/258; 502/261; 502/262; 977/883

(58) Field of Classification Search ................ 502/334, 502/170, 173, 240, 258, 261, 262, 5; 977/883
See application file for complete search history.

(56) References Cited

U.S. PATENT DOCUMENTS

| | | | |
|---|---|---|---|
| 5,316,990 A | 5/1994 | Cooper | 502/5 |
| 5,489,563 A | 2/1996 | Brand | 502/185 |
| 5,939,220 A | 8/1999 | Gunner | 429/40 |
| 6,007,934 A | 12/1999 | Auer | 429/44 |
| 6,649,300 B2 * | 11/2003 | Ito et al. | 429/44 |
| 6,709,622 B2 | 3/2004 | Billiet | 264/432 |
| 6,858,521 B2 | 2/2005 | Jin | 438/551 |
| 7,084,002 B2 * | 8/2006 | Kim et al. | 438/104 |

(Continued)

FOREIGN PATENT DOCUMENTS

EP 1 728 618 * 12/2006

OTHER PUBLICATIONS

"Sphere templating methods for periodic porous solids," Andreas Stein. Microporous and Mesoporous Materials 44-45 (2001) pp. 227-239.*

(Continued)

*Primary Examiner*—Patricia L Hailey (57) ABSTRACT

This invention relates to the preparations of noble metal catalysts, i.e., platinum and platinum alloys, on suitable supports with nanonetwork structures and high catalytic efficiencies. A compact structure of a monolayer or a few layers is formed by self-assembly of organic polymer, e.g., polystyrene (PS), nanospheres or inorganic, i.e., silicon dioxide ($SiO_2$), nanospheres on a support surface. In the void spaces of such a compact arrangement, catalyst is formed by filling with catalyst metal ion-containing aqueous solution and reduced by chemical reduction, or formed by vacuum sputtering. When using organic polymer nanospheres as the starting or structure-directing material, the polymer particles are removed by burning at a high temperature and the catalyst having a nanonetwork structure is obtained. In the case of using silicon dioxide nanospheres as the starting material, silicon dioxide particles are dissolved with hydrofluoric acid solution and evaporated away leading to formation of a similar nanonetwork structure made of catalyst. The catalysts prepared by these methods possess characteristics of robust in structure, uniform in hole size and high in catalytic surface area. Their main applications include uses as catalysts in direct methanol and proton exchange membrane fuel cells, as well as in chemical reactors, fuel reformers, catalytic converters, etc.

4 Claims, 8 Drawing Sheets

U.S. PATENT DOCUMENTS 7,108,813 B2 * 9/2006 Kang et al. .................... 264/42
7,311,943 B2 * 12/2007 Jacobson et al. ............ 427/258

OTHER PUBLICATIONS

"Noble metal fuel cell catalysts with nano-network structures," Chun-Ching Chien et al. Materials Chemistry and Physics 103 (2007), pp. 400-406.*

"Template-Directed Preparation of Macroporous Polymers with Oriented and Crystalline Arrays of Voids," P. Jiang et al. J. Am. Chem. Soc. 1999, 121, pp. 11630-11637.*

"Preparation of Macroporous Metal Films from Colloidal Crystals," Peng Jiang et al. J. Am. Chem. Soc. 1999, 121, pp. 7957-7958.*

"Polymer nanocomposite membranes for DMFC application," C. S. Karthikeyan et al. Journal of Membrane Science 254 (2005), pp. 139-146.*

"Self-assembly of nanoparticles into structured spherical and network aggregates," Andrew K. Boal et al. Nature, vol. 404, Apr. 13, 2000, pp. 746-748.*

"A Chemical Synthesis of Periodic Macroporous NiO and Metallic Ni," Hongwei Yan et al. Advanced Materials 1999, 11, No. 12, pp. 1003-1006.*

"Highly Ordered Macroporous Gold and Platinum Films Formed by Electrochemical Deposition through Templates Assembled from Submicron Diameter Monodisperse Polystyrene Spheres," P. N. Bartlett et al. Chem. Mater. 2002, 14, pp. 2199-2208.*

* cited by examiner

METHODS OF MAKING PLATINUM AND PLATINUM ALLOY CATALYSTS WITH NANONETWORK STRUCTURES

FIELD OF THE INVENTION

This invention provides methods to the preparations of platinum and platinum alloy-based catalysts having nanonetwork structures on appropriate supports, e.g., carbon paper, glass carbon, graphite, ceramics, glass, metals, etc., having relatively smooth surfaces. More specifically, the invention relates to the use of nano-sized organic polymer, e.g., polystyrene (PS), poly(methyl methacrylate) (PMMA) or inorganic, e.g., silicon dioxide ($SiO_2$), nanospheres to form closely packed, layered structure by means of self-assembly. In general, a monolayer or a few layers of well-defined, face-centered cube lattices are desirable. Such formed compact, layered structure is heat-dried to remove solvents, in which the polystyrene or silicon dioxide nanospheres are originally dispersed, resulting a compact, robust, three-dimensional nano network with some void spaces. Then, in the void spaces of such a compact arrangement, catalyst metal ions in aqueous solution are filled and reduced chemically or catalyst metals are sputtering filled. When using polystyrene nanospheres as the starting material, the polymer particles are removed at a high temperature and the catalyst having a nanonetwork structure is obtained. In the case of using silicon oxide nanospheres as the starting material, silicon oxide particles are dissolved with hydrofluoric acid solution and evaporated away leading to formation of a similar nanonetwork structure made of catalyst. The prepared catalysts have characteristics of three-dimensional (3-D) nano network with rigid structure, uniform hole-size and high surface area.

BACKGROUND OF THE INVENTION

Catalysts play key roles in most of the important chemical reactions, including syntheses of organic compounds, reforming production of hydrogen from methanol, natural gas and gasoline, catalytic conversion of carbon monoxide, nitrogen oxides and unburned fuels, etc. In particular, platinum and platinum alloys are indispensable catalysts for direct methanol and proton exchange membrane fuel cells with respect to electro-reduction of oxygen and electro-oxidation of fuel. So far, most of the catalysts are prepared using suitable supports, such as carbon blacks, ceramics and silica gels. The so-called nanocatalysts are those having particles prepared in nano-sizes, generally a few nanometers.

In preparing catalysts for DMFC and PEMFC applications, high surface area carbon supports, such as Cabot Vulcan XC-72 and Chevron Shawinigan, are commonly used. Typical examples of state-of-the-art for making carbon black-supported platinum and platinum alloy catalysts are given by Cooper et al. U.S. Pat. No. 5,316,990, Brand et al. U.S. Pat. No. 5,489,563, Gunner et al. U.S. Pat. No. 5,939,220 and Auer et al. U.S. Pat. No. 6,007,934. In general, catalyst metal in ions or colloidal sols are adsorbed to carbon support surfaces and reduced by chemical reactions. High temperature reduction using hydrogen gas is also commonly used. However, such prepared nanocatalysts suffer from drawbacks of re-construction, re-crystallization and sintering when in use to form larger particles and substantially lose their catalytic surfaces. These give rise to significantly lower catalytic efficiencies and shorter service lives. Novel approaches are needed to prepare and stabilize catalysts under all application conditions.

Due to the advancement of nanotechnologies, nanostructures can be readily fabricated. In one example, Billliet et al., U.S. Pat. No. 6,709,622 illustrates a method to fabricate nanostructures containing isotropically distributed, interconnected pores having cross-sectional diameters in the nanometer and Angstrom ranges. Briefly, inorganic nanoparticles are used as a precursor and mixed with organic polymer to form a homogeneous thermoplastics compound. The organic polymer is then removed by sintering at a high temperature and a nanostructure is formed. In another example shown by Jin, U.S. Pat. No. 6,858,521, a spaced-apart array of nanostructures is fabricated by providing a show mask having a plurality of spaced apart, relatively large apertures, reducing the size of the aperture to nanoscale dimensions, and depositing a material through the mask to form a plurality of spaced-apart nanostructures. However, in general these nanostructures are suitable for used as catalyst supports only rather than as catalysts. It would be very beneficial if a catalyst itself can be fabricated into a nanostructure with excellent resistances to recombination, recrystallization and sintering wile providing high surface area and high catalytic efficiency.

In fact, using some nanomaterials, e.g., polystyrene nanospheres and silicon dioxide nanospheres, as structure-directing agents do provide a new approach to achieve this goal. These nanospheres readily form closely packed, layered structures of one to several layers on a smooth support surface when applied at diluted conditions. With these unique characteristics of such nanomaterials, this invention is able to prepare novel catalysts with nanonetwork structures on suitable supports that are totally different from those of the conventional nano catalysts. The advantages are to overcome the drawbacks encountered by conventional nanocatalysts. In addition, the platinum and platinum alloys catalysts prepared by the invented methods will significantly improve the performances of DMFCs and PEMFCs due to robust structure, resistant to recombination, and high catalytic surfaces.

SUMMARY OF THE INVENTION

The present invention includes methods to prepare or produce platinum and platinum alloy-based catalysts having nanonetwork structures on supports. Polystyrene nanospheres or silicon dioxide nanospheres are used as the starting or structure-directing material to form a perfectly arranged, layered structure through a self-assembly process on a support. The catalyst is then formed and filled in the void spaces of the layered structure by chemical reduction or vacuum sputtering. Removing the starting material by means of thermal decomposition or chemical dissolution, a catalyst with nanonetwork structure is obtained.

BRIEF DESCRIPTION OF THE DRAWINGS

The accompanying drawings serve to explain the principles of the invention and illustrate the embodiments of the present invention. In the drawings.

DETAILED DESCRIPTION

Self-assembly is one of the simplest ways to fabricate layered structures and, in particular, to form nano-sized structures. This process involves the interactions of several forces including van der Waals forces. Several organic polymers and inorganic materials now can be prepared into nanospheres and are commercially available. These nanomaterials can be used to form closely-packed, layered structures of one or several layers on suitable supports. For example, polystyrene nanospheres are first diluted in approximate solvents containing organics and water and applied to a smooth glass support, and then solvents are removed by evaporation. A compact, well-defined layer structure is readily formed. In addition, the void spaces of such a layered structure can be further filled with $TiO_2$ nanospheres of smaller sizes. When the solvents are dried away and polystyrene nanospheres are burned and completely removed, a new nanonetwork structure made of $TiO_2$ nanoparticles is formed. Such a nanonetwork structure provides a large void space and high surface areas. Obviously, if catalysts can be prepared into similar nanonetwork structures, they are expected to exhibit high catalyst stabilities and catalytic efficiencies.

Inspired by this finding, novel methods to prepare platinum and platinum alloy-based catalysts having nanonetwork structures are developed. Thus, this invention relates to the use of nano-sized polymer, such as, polystyrene, or inorganic, such as, silicon dioxide, spheres in dilute solutions (e.g., 0.1 wt %) to form closely packed, layered structure by means of self-assembly. Appropriate supports include carbon paper, glass carbon, graphite, ceramics, glass, metals etc., having relatively smooth surfaces. In general, a monolayer or multi-layer of well defined, face-centered cube (f.c.c.) lattice is formed by dispersing dilute solution of nanosphere to the support surface. The self-assembly formed compact, layered structure is heat-dried to remove solvents, in which the polystyrene or silicon spheric particles in nano-sizes are originally dispersed, resulting in a well-defined, three-dimensional nano network with some void spaces. Then, in the void spaces of such a compact arrangement, catalyst metal ions in aqueous solution are filled and reduced chemically or catalyst metals are filled. Suitable catalyst materials include platinum (Pt) and alloys of platinum with ruthenium (Ru), iridium (Ir), palladium (Pd), rhodium (Rh), and osmium (Os). When using polystyrene nanospheres as the starting material, the polymer nanoparticles are removed at a high temperature (<400° C.) and the catalyst having nanonetwork structure is obtained. In the case of using $SiO_2$ nanospheres as the starting material, $SiO_2$ nanoparticles are dissolved with hydrofluoric acid (HF) aqueous solution and slightly heated (<100° C.) to evaporate away leading to formation of similar nanonetwork structure. The prepared nanonetwork catalysts show robust structure, uniform hole-size, spacious voids and high catalytic surface areas. The loading of catalyst can be much lower than that obtained using carbon black powder as a support (e.g., <0.1 $mgPt/cm^2$). These platinum and platinum alloy-based catalysts with nano network structures can be applied to direct methanol fuel cells (DMFCs) and proton exchange membrane fuel cells (PEMFCs) as well as chemical reactors, fuel reformers, and catalytic converters.

EXAMPLE 1

Figure 4:
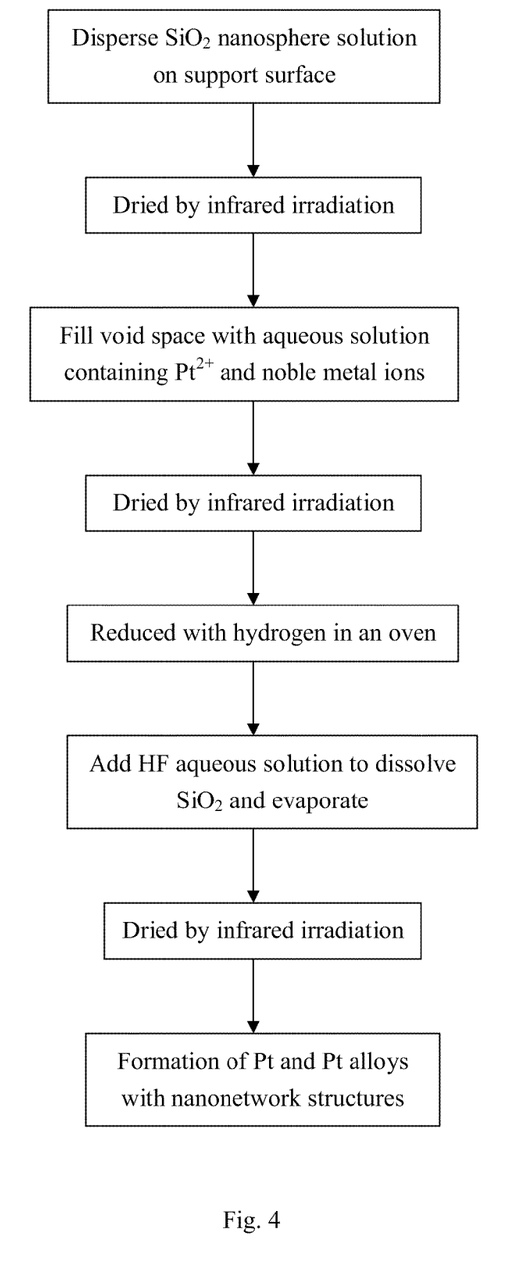
FIG. 4 is a flow diagram to illustrate EXAMPLE 1 of method for making Pt and platinum alloy catalysts with nanonetwork structure.

In FIG. 4, a flow diagram illustrates a method for making Pt and platinum alloy catalysts with nanonetwork structure using $SiO_2$ nanospheres as the starting material and reduced with hydrogen gas in an oven.

EXAMPLE 2

Figure 1:
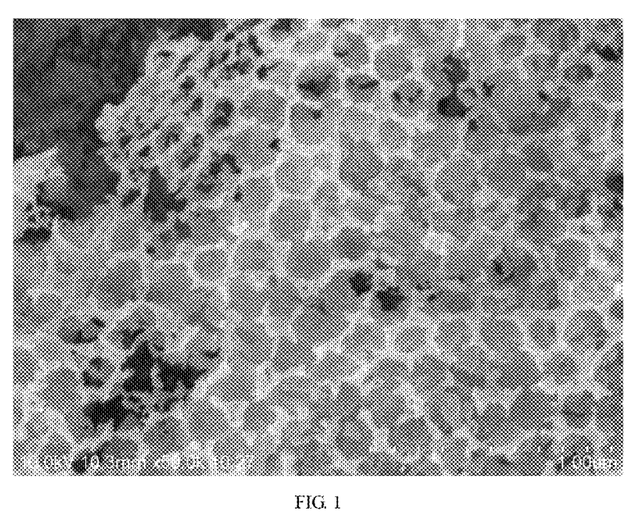
FIG. 1 is a pictorial illustration of a platinum catalyst with nanonetwork structure prepared according to an exemplary embodiment (EXAMPLE 2) of the present invention. The staring material is $SiO_2$ nanospheres and the support is carbon paper.
Figure 5:
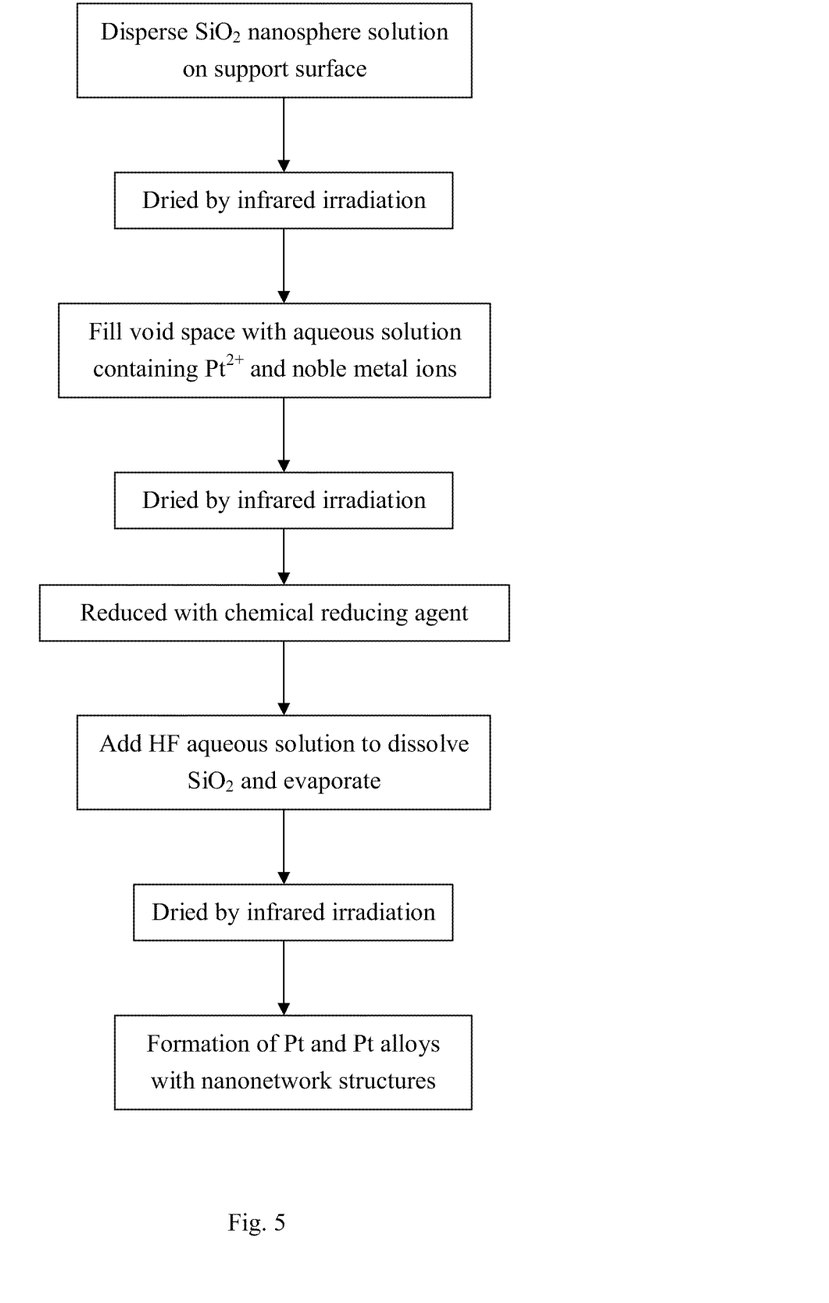
FIG. 5 is a flow diagram to illustrate EXAMPLE 2 of method for making Pt and platinum alloy catalysts with nanonetwork structure.

In FIG. 5, a flow diagram illustrates a method for making Pt and platinum alloy catalysts with nanonetwork structure using $SiO_2$ nanospheres as the starting material and chemically reduced using chemical reducing agents, e.g., hydrazine, formaldehyde, formic acid, sodium sulfite, and sodium borohydride, etc. The resultant Pt catalyst with nanonetwork structure is shown in FIG. 1.

EXAMPLE 3

Figure 6:
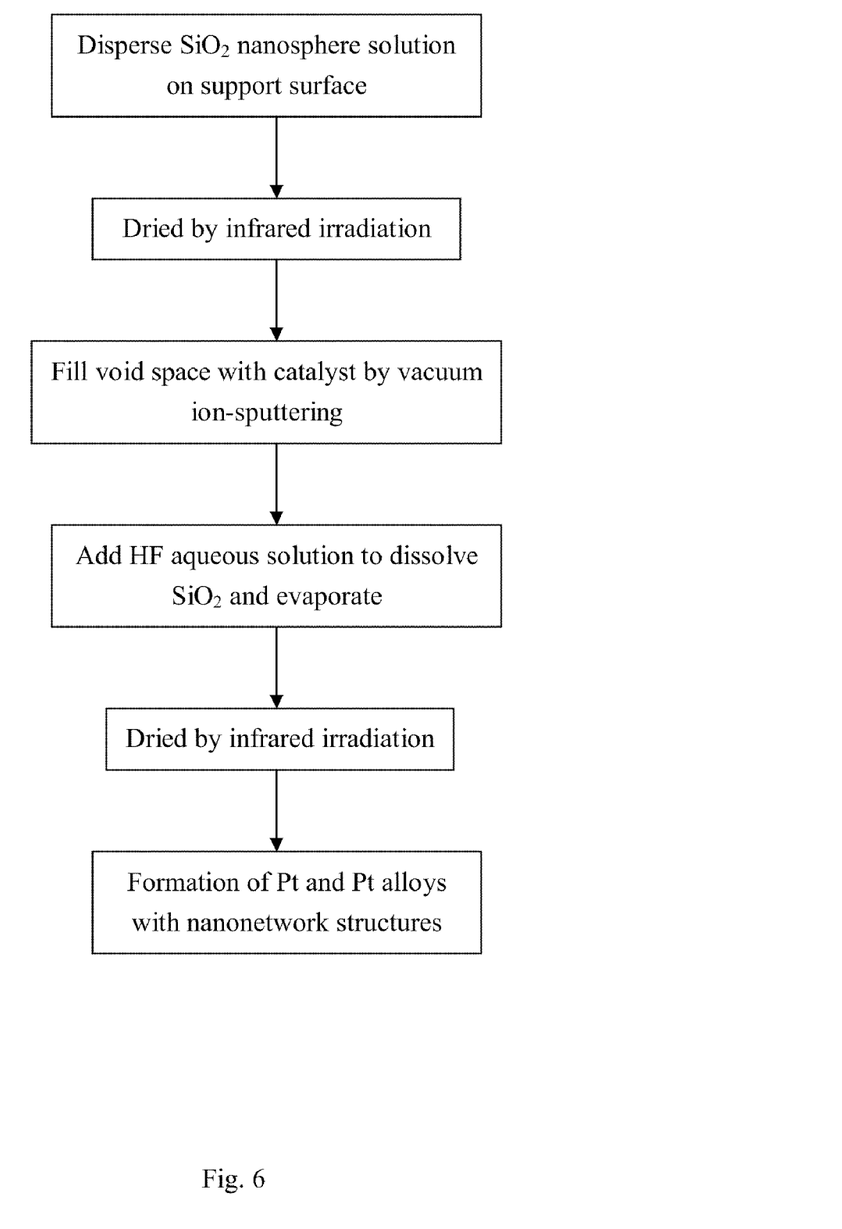
FIG. 6 is a flow diagram to illustrate EXAMPLE 3 of method for making Pt and platinum alloy catalysts with nanonetwork structure.

In FIG. 6, a flow diagram illustrates a method for making Pt and platinum alloy catalysts with nanonetwork structure using $SiO_2$ nanospheres as the starting material and fill catalyst by vacuum sputtering.

EXAMPLE 4

Figure 2:
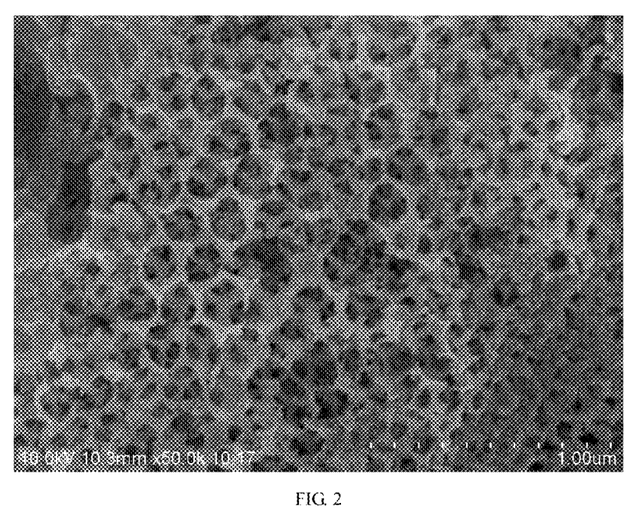
FIG. 2 is a pictorial illustration of a platinum catalyst with nanonetwork structure prepared according to an exemplary embodiment (EXAMPLE 4) of the present invention. The staring material is PS nanospheres and the support is glass.
Figure 7:
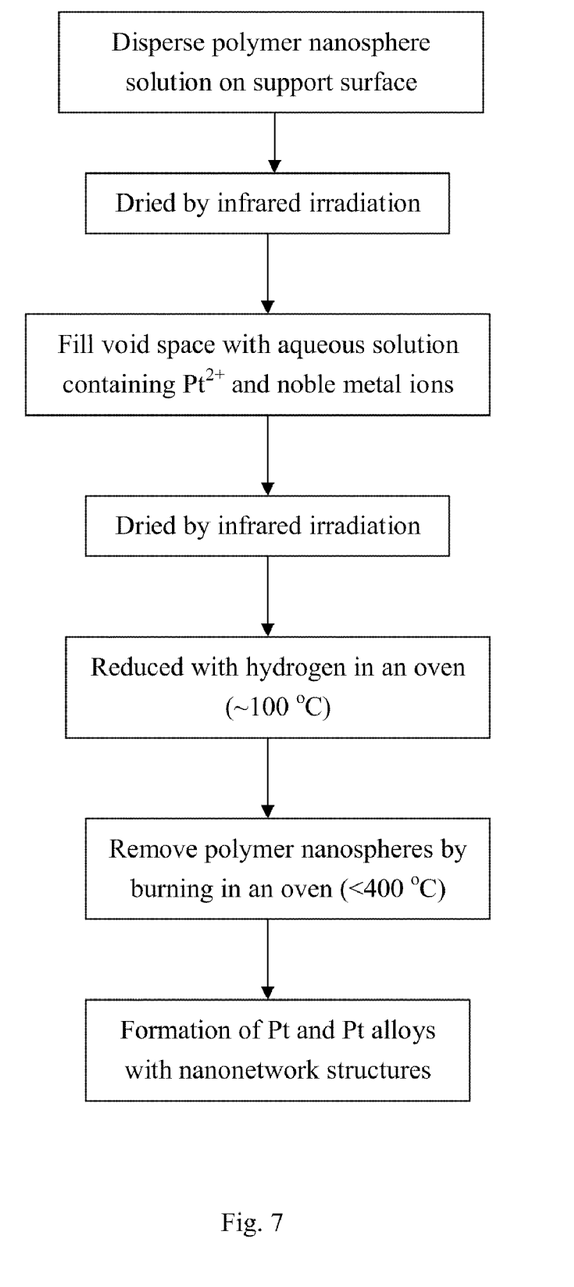
FIG. 7 is a flow diagram to illustrate EXAMPLE 4 of method for making Pt and platinum alloy catalysts with nanonetwork structure.

In FIG. 7, a flow diagram illustrates a method for making Pt and platinum alloy catalysts with nanonetwork structure using organic polymer nanospheres as the starting material and chemically reduced using hydrogen gas. The resultant Pt catalyst with nanonetwork structure is shown in FIG. 2.

EXAMPLE 5

Figure 3:
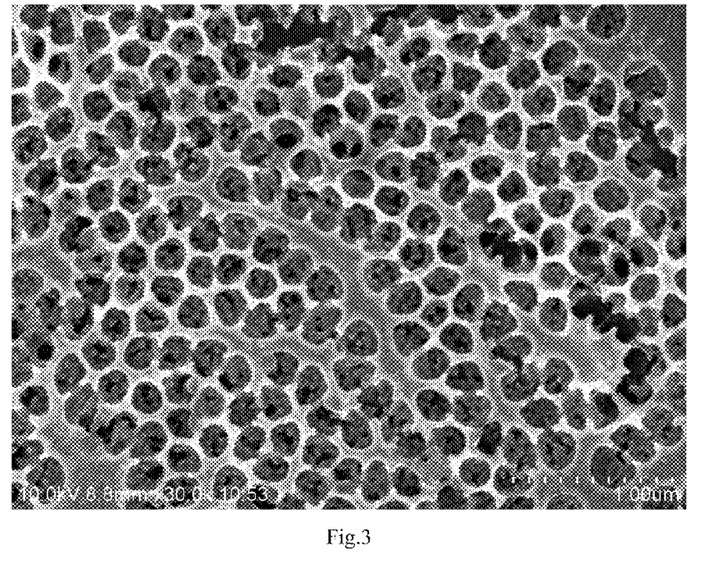
FIG. 3 is a pictorial illustration of a platinum-ruthenium alloy catalyst with nanonetwork structure prepared according to an exemplary embodiment (EXAMPLE 4) of the present invention. The staring material is PS nanospheres and the support is glass.
Figure 8:
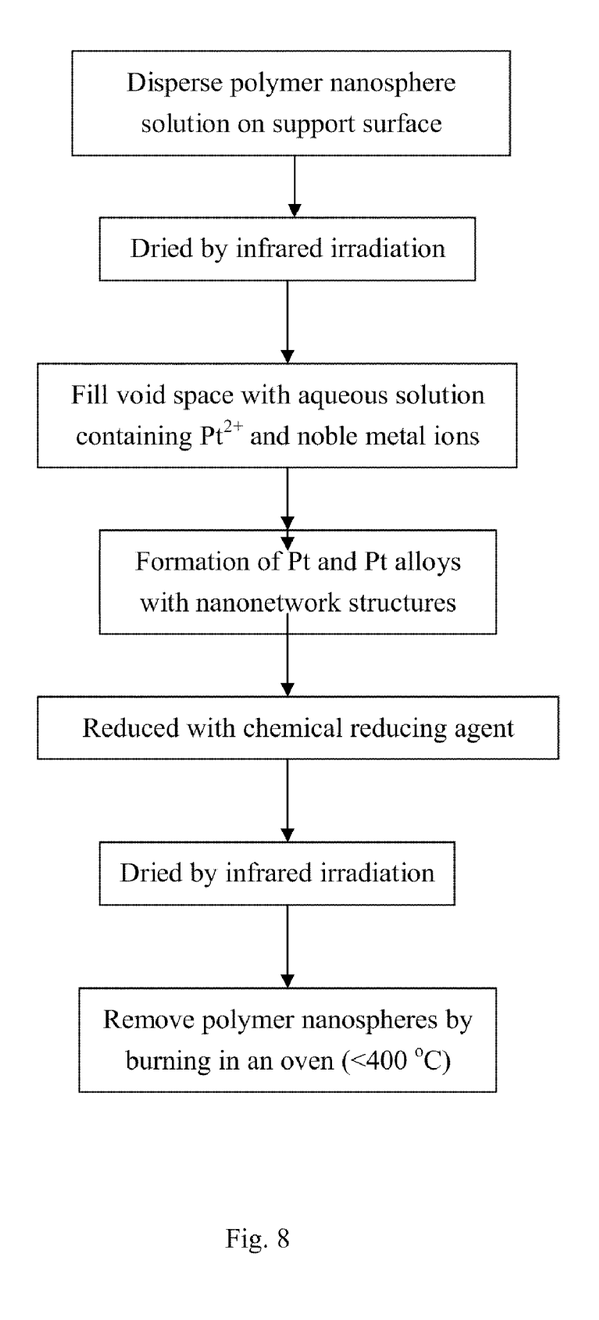
FIG. 8 is a flow diagram to illustrate EXAMPLE 5 of method for making Pt and platinum alloy catalysts with nanonetwork structure.

In FIG. 8, a flow diagram illustrates a method for making Pt and platinum alloy catalysts with nanonetwork structure using organic polymer nanospheres as the starting material and chemically reduced using chemical reducing agents, e.g., hydrazine, formaldehyde, formic acid, sodium sulfite, and sodium borohydride, etc. The resultant Pt—Ru alloy catalyst with nanonetwork structure is shown in FIG. 3.

EXAMPLE 6

Figure 9:
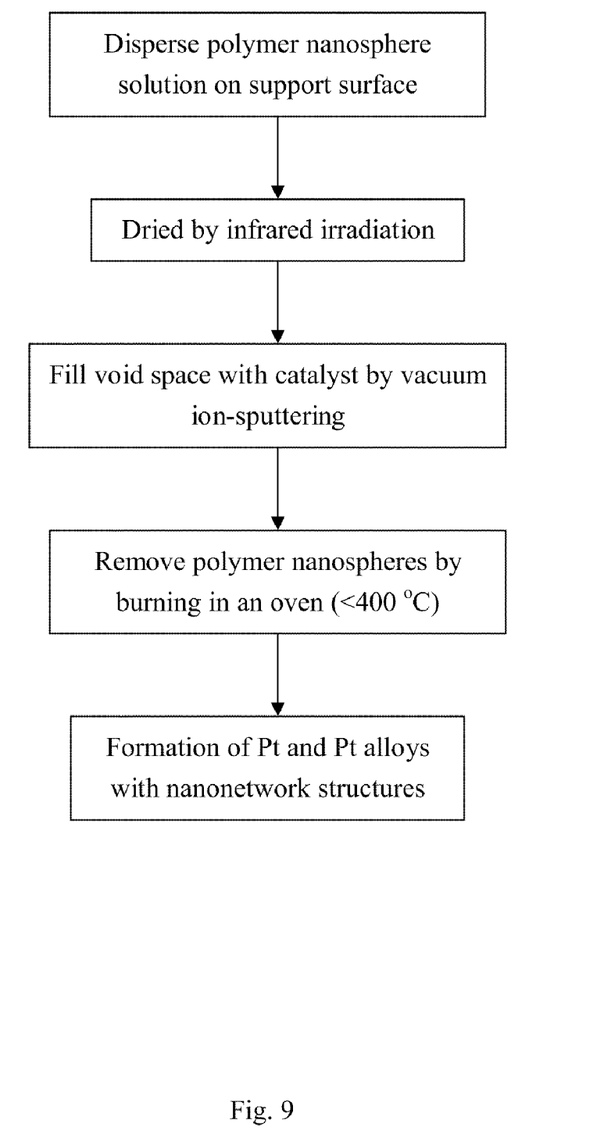
FIG. 9 is a flow diagram to illustrate EXAMPLE 6 of method for making Pt and platinum alloy catalysts with nanonetwork structure.

In FIG. 9, a flow diagram illustrates a method for making Pt and platinum alloy catalysts with nanonetwork structure using organic polymer nanospheres as the as the starting material and fill catalyst by vacuum sputtering.

What is claimed is:

1. Methods to prepare platinum and platinum alloy catalysts on supports, wherein the starting or structure-directing material is organic polymer nanospheres and the nanospheres are first dispersed on a support surface forming a compact, layered structure of a monolayer or a few layers through a self-assembly process, and platinum or platinum alloy catalyst is then formed and filled in the void spaces of the layered structure by chemical reduction from an aqueous solution containing metal ions or by vacuum ion-sputtering, and the starting material is then removed by means of burning or chemical dissolution to obtain said platinum and platinum alloy catalysts, characterized in that the polymer nanospheres include polystyrene nanospheres and poly (methyl methacrylate) (PMMA) nanospheres having diameters ranging from 50 nanometers to several micrometers, wherein said metal ions filled in the void spaces of the layered structure are dried using infrared irradiation or other heating methods, followed by hydrogen reduction at high temperatures (<300° C.).

2. The methods of claim 1, wherein metal ions filled in the void spaces of the layered structure on the supports are dried using infrared irradiation or other heating methods, followed by adding reducing agents including hydrazine ($N_2H_4$), formaldehyde, formic acid, sodium sulfite, sodium borohydride ($NaBH_4$).

3. The methods of claim 1, wherein metals filled in the void spaces of the layered structure on the supports are achieved by vacuum spray and ion-sputtering methods.

4. The methods of claim 1, wherein the organic polymer nanospheres used for the preparation of platinum and platinum alloy catalysts are removed by heating (<400° C.) with high temperature ovens and air-blowing oxidation ovens.

* * * * *